July 20, 1948.                L. A. RICHARDS                2,445,717
                       MEANS AND METHOD OF IRRIGATING PLANTS
Filed Aug. 6, 1945                                    2 Sheets-Sheet 1
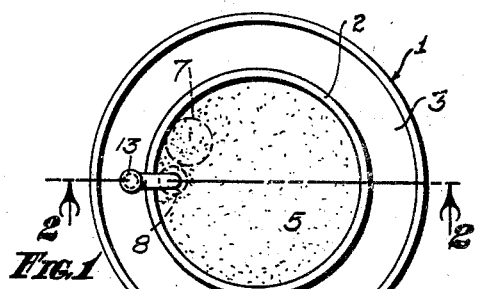
Fig.1
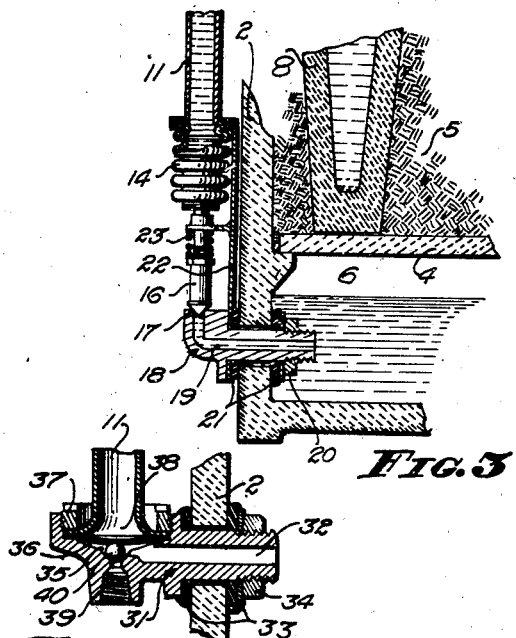
Fig.3
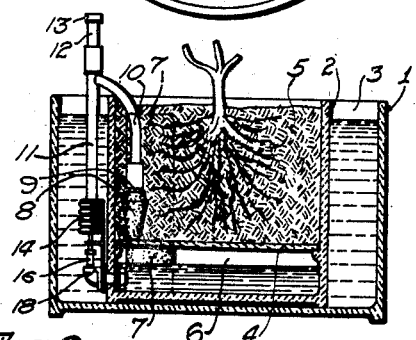
Fig.2
Fig.4
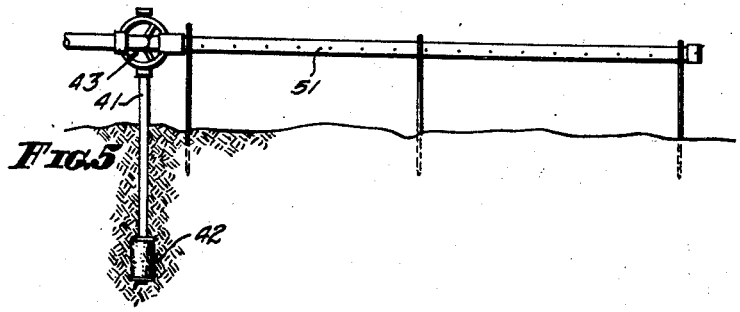
Fig.5
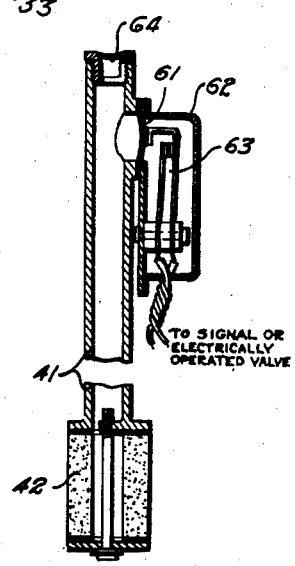
Fig.7
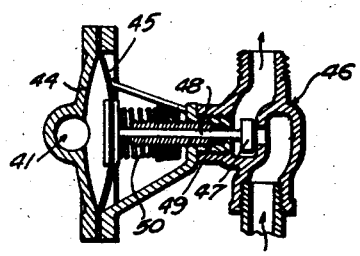
Fig.6
Inventor
LORENZO A. RICHARDS
By Lloyd Spencer
    Attorney July 20, 1948.  L. A. RICHARDS  2,445,717
MEANS AND METHOD OF IRRIGATING PLANTS
Filed Aug. 6, 1945  2 Sheets-Sheet 2

Inventor
LORENZO A. RICHARDS
By Lloyd Spencer
Attorney

Patented July 20, 1948

2,445,717

UNITED STATES PATENT OFFICE 2,445,717

MEANS AND METHOD OF IRRIGATING PLANTS

Lorenzo A. Richards, Riverside, Calif.

Application August 6, 1945, Serial No. 609,109

14 Claims. (Cl. 47—38)

My invention relates to means and method of irrigating plants; more particularly, to a means and method for intermittently and automatically supplying water to soil in which plants are growing.

Among the objects of my invention are:

First, to provide a means and method of this character wherein water is automatically supplied to the soil whenever the soil moisture content of the water in the soil drops below a predetermined value and wherein the water is automatically shut off when an adequate amount has been supplied to the soil.

Second, to provide a means and method of this character which insures a wetting and drying cycle whereby the soil is properly aerated.

Third, to provide a means and method of this character which adapts itself automatically to increase in plant growth and its attendant increase in demand for water as well as variations in moisture requirement due to changes in ambient temperature and humidity.

Fourth, to provide a means and method of this character which has a wide range of application; that is, a means and method of watering plants which may be employed to supply the needs of a single plant in a jardiniere or pot, or a series of plants in a window box or indoor garden, a green house or in other artificial surroundings, or may be employed in an outdoor garden or plant bed or for specific plants or trees.

Fifth, to provide a means and method of this character which may be employed with above ground sprinkling systems, irrigating systems or subsurface irrigating systems.

Sixth, to provide a means and method of this character which is particularly adapted to control a subsurface irrigating system.

Seventh, to provide a novel automatic means for effecting subsurface irrigation whether the area to be irrigated is sloping or level.

With the above and other objects in view as may appear hereinafter, reference is directed to the accompanying drawings, in which:

Fig. 1 is a top or plan view of a jardiniere equipped with one form of my invention.

Fig. 2 is a sectional view through 2—2 of Fig. 1.

Fig. 3 is an enlarged fragmentary partial sectional, partial elevational view of the control means employed in Figs. 1 and 2.

Fig. 4 is a fragmentary sectional view of a modified form of control valve.

Fig. 5 is a diagrammatical view of an above-ground sprinkler system equipped with a form of my invention whereby the sprinkling system is turned off and on.

Fig. 6 is a schematic or idealized sectional view of a control valve suitable for use as an element of my invention.

Fig. 7 is an enlarged partially elevational, partially sectional view of my invention arranged to control an electric circuit which may be caused to control signal devices or relays to actuate water supply pumps or valves.

Figure 13:
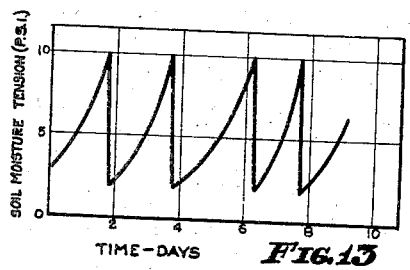
Figure 14:
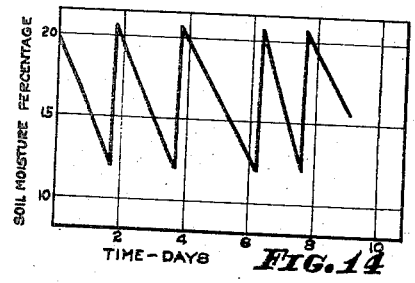
Figure 15:
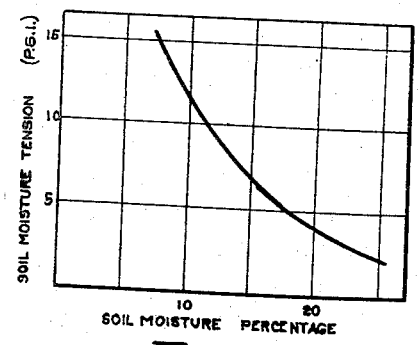

Figs. 13, 14, and 15 are graphs illustrating the variations in soil moisture tension and percentage produced by my control means and method.

The operation of my soil moisture control system is based on the fact that as soil dries out from a saturated condition to the wilting condition there is a continuous decrease in the pressure in the soil water. In the absence of a water table, the pressure in the soil water when the soil is saturated is approximately atmospheric pressure, whereas at the wilting percentage the pressure is less than atmospheric pressure by as much as 15 atmospheres. That is, at the soil moisture condition at which plant growth stops, the equivalent negative pressure or tension in the moisture films on the soil particles is about 225 lbs. per square inch.

Each soil has a characteristic relation between the soil moisture tension and the soil moisture percentage. At a given tension a fine textured soil will hold more water than a coarse sandy soil. The soil moisture tension, though, is a measure of the security with which the water is held by the soil and hence is a measure of the ease with which this water is absorbed by the plant roots.

The pressure within a porous ceramic cell when filled with water and buried in soil will tend to reflect the soil moisture tension within the range from zero, at saturation, to about 14 pounds per square inch. It is a fact that for most soils the moisture range corresponding to the 0 to 14 pounds per square inch (p. s. i.) tension range represents the major part of the plant growth moisture range. When the soil moisture tension gets higher than 14 p. s. i. the water in a porous cell system will be extracted by the soil and will be replaced by air. However, by judicious placement of the porous cell with respect to the plant root system in the soil, a water filled porous cell system can be kept in the operating range of 0 to 14 p. s. i. for any reasonable soil moisture depletion desired between irrigations, and the porous cell system will remain in an operative condition, i. e., filled with water for long periods of time.

My invention makes use of this phenomenon in such a way that an irregation supply will automatically be turned on when the soils dry out to a predetermined condition and after the soil becomes wetted will automatically turn off. For purposes of explanation reference is first directed to Figs. 1, 2, and 3. This embodiment of my invention is particularly adapted to self-contained jardiniere structures or boxes; that is, a container for a plant or several plants and a reservoir containing a water supply sufficient for several waterings are incorporated into a single unit.

As illustrated, an outer container 1 receives an inner container 2, the walls of the two containers forming an annular reservoir 4. The inner container 2 is provided with a partition 4, dividing the inner container into a soil compartment 5 and a water supply compartment 6, the former being filled with soil and the latter adapted to be supplied from time to time from the reservoir 3.

The containers may be composed of any suitable materials, preferably, however of metal or ceramic materials. In the latter case the surfaces of the outer container 1 are glazed. The outer surfaces of the inner container 2 are also glazed, but its inner surfaces are preferably left unglazed. Furthermore, if the inner container is composed of ceramic material, its side walls are preferably porous and of sufficient thickness that they readily draw upwardly into the soil, water contained in the compartment 6. If the inner container be formed of metal or if the walls have insufficient capacity to remove water from compartment 6 into dry soil in the compartment 5, one or more wicks 7 of ceramic or other porous material may be employed.

Within the soil compartment 5 in moisture transfer relation to soil therein is a porous cell 8. The porous cell may be in the form of a cup having a reduced tubular neck 9 adapted to be connected by suitable means such as a yieldable slip collar to a tube 10.

The tube 10 extends over the upper end of the inner container and joins a vertical tube 11 extending into the reservoir 3. The upper end of the tube 11 is provided with a transparent extension 12 closed by a stopper 13, or other suitable removable sealing device. The lower end of the tube 11 is provided with a bellows or diaphragm unit 14, the extended end of which is equipped with a threaded stem 15.

Mounted on the end of the stem 15 is an adjustable valve member 16 which co-acts with an upwardly directed valve seat 17 provided in a valve seat body 18. The valve seat 17 forms the entrance to a bore 19 extending through the valve seat body 18. The valve seat body includes a laterally directed threaded portion adapted to be fitted into a hole provided in the inner container 2 near the bottom of the water supply compartment 6. A nut 20 and washers 21 seal the connection between the valve body and the inner container.

A bracket 22 is clamped between the valve body and the inner container and extends upwardly to form a guide for the stem 15 and a support for the lower end of the tube 11. A spring 23 is interposed between the stem guiding portion of the bracket and the valve 16.

Reference is now directed to Figure 4. In this construction a valve body 31 is substituted for the valve body 18. The valve body 21 includes a lateral stem 32 extending through the inner container 2 into the water supply compartment 6 and is provided with suitable washers 33 and a nut 34 to secure the valve body in place. The outer end of the valve body is provided with an upwardly directed valve chamber 35 which is covered by a snap diaphragm 36. A clamping ring 37 secures the diaphragm in place. The clamping ring is also employed to clamp the lower flared end 38 of the tube 11. The valve body is provided with an intake port 39 centered with respect to the chamber 35 and adapted to be closed by a ball valve 40. The ball valve is held in the intake port by the diaphragm 36. The lateral stem 32 is tubular and communicates with the valve chamber 35 so that the diaphragm acting on the ball check may control the flow of water into the water supply compartment 6. The intake port 39 may communicate with the reservoir 3 or may be connected by tubing or a pipe line, not shown, to any source of water supply.

The structures described in Figures 1 through 4 operate as follows:

The soil compartment 5 is filled with soil and a plant or plants. The stopper 13 is removed and the porous cell 8 as well as the tubes 10 and 11 are filled with water, preferably in such a manner that no appreciable amount of air remains in the system. Assuming that the soil in the soil compartment 5 is relatively dry there will occur an outward diffusion of water through the porous cell due to the lower pressure of the soil water. Such transfer of water creates a negative pressure within the cell and the system connected therewith corresponding to the water pressure conditions in the soil. As indicated hereinbefore the available pressure may amount to several pounds per square inch and thus is amply sufficient to collapse the bellows 14 or diaphragm 36 opening the valve 16 or 40 between the water supply compartment and the reservoir 3 or other source of water as the case may be. When the water supply compartment 6 has filled and the soil in the bottom of the soil compartment has been wetted the outward transfer of water through the porous cell is stopped and a reverse flow occurs relieving the vacuum pressure on the water within the cell and permitting the bellows 14 or the diaphragm 36 to return to its initial position closing its corresponding valve.

The pressure within the porous cell and connecting system remains at substantially atmospheric pressure as long as the water from the water supply compartment is conducted to the soil in the soil compartment at a sufficient rate to maintain the soil relatively wet. When the supply of water has been depleted and the soil dries out, migration of water through the porous cell again occurs causing a vacuum which again opens the valve 16 or 40 as the case may be.

As long as the system associated with the porous cell is completely full of water very little actual transfer of water is required to effect operation of the valve, thus the water within the cell and associated system remains therein and is not appreciably contaminated by water from the soil or by intrusion of air. Thus, it is desirable to maintain the porous cell and associated system as free from air as possible although an appreciable quantity may collect without materially interfering with the operation. The effect of air in the system is to introduce a greater time delay and to increase the amount of water transfer through the porous walls.

The air accumulation in the system is due to occluded air in the water filling the system or in water transferred from the soil, or air drawn in directly through the porous cell. However, if the bellows or diaphragm valve associated with the porous cell is designed to open at less than 14 pounds per square inch; that is, if the valve opens at pressures between 6 and 12 pounds per square inch very little air will accumulate.

If air does accumulate in the system, its presence may be detected in the transparent extension 12 and may be removed by removing the stopper 13 and refilling with water. As indicated above, under proper operating conditions, the soil is not allowed to dry excessively and the device will continue in operation for months without the accumulation of a detrimental amount of air in the system associated with the porous cup.

Reference is now directed to Figures 5 and 6. Here my apparatus is adapted for use in gardens to control an overhead irrigation system. In this construction, a tube 41 provided with a porous unit 42 at its lower end is partially buried in soil in proximity to the plant or plants to be irrigated. This may be in the middle of a bed of plants or at the lower end thereof or at any point which is likely to be representative of conditions throughout the bed. The upper end of the tube 41 may be connected directly or through an interposed pipe line to a diaphragm controlled valve indicated generally by 43.

The diaphragm control valve per se may be conventional. It consists essentially of a diaphragm housing 44 having a diaphragm 45 forming with the housing a chamber which communicates with the tube 41 and the porous element 42. Secured to the diaphragm housing 44 is a valve housing 46 containing a valve 47 having a valve stem 48 which projects through a packing gland 49 and is joined to or bears against the diaphragm 45. A spring 50 is provided, the tension of which is preferably adjusted so that the valve is caused to open when a predetermined sub-atmospheric pressure exists in the porous unit. The diaphragm itself or another spring is provided with sufficient force to close the valve when the pressure in the porous unit approaches atmospheric. The valve housing 46 is connected to a suitable source of water supply and to a conventional irrigating system such as an overhead perforated pipe 51 arranged along or around the plant bed.

Suitable means such as a stopper or cap 52 is provided so that the tube 41, porous unit 42 and chamber of the diaphragm housing may be filled and replenished with water. The porous unit may be a cup shaped member such as shown in Figures 2 and 3 or may be in the form of a cylinder closed by a cap on one end and bearing against a flange provided at the lower end of the tube 41, as shown in Fig. 7.

Figure 8:
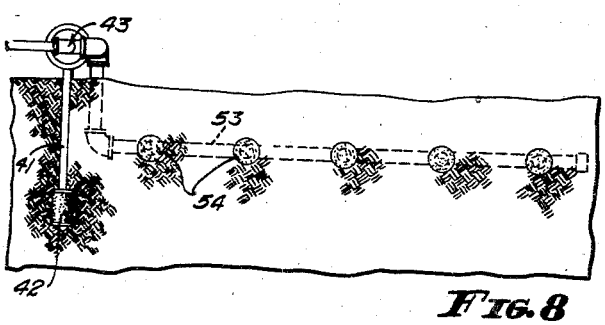
Fig. 8 is a diagrammatical view of one form of subsurface irrigating system controlled by my invention.
Figure 9:
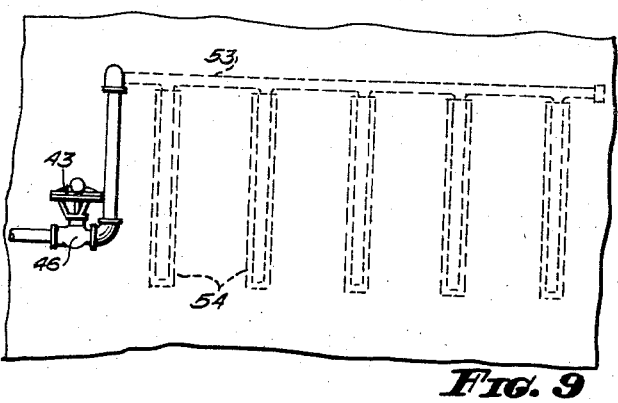
Fig. 9 is a diagrammatical plan view thereof.
Figure 10:
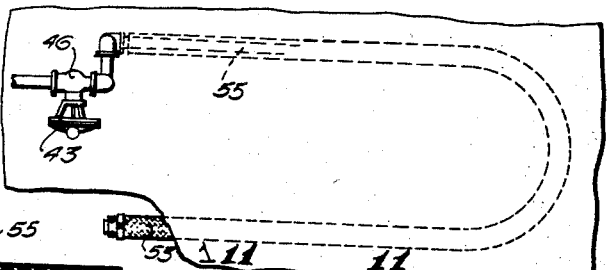
Fig. 10 is a diagrammatical plan view of another form of subsurface irrigating system controlled by my invention.
Figure 11:
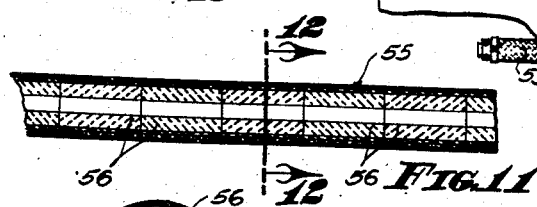
Fig. 11 is an enlarged idealized sectional view through 11—11 of Fig. 10, showing the construction of the subsurface irrigating element.
Figure 12:
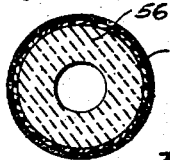
Fig. 12 is a further enlarged transverse sectional view through 12—12 of Fig. 11.

My apparatus lends itself particularly well to the control of sub-surface irrigation systems, such as shown in Figures 8 to 12 inclusive. In Figures 8 and 9 the sub-surface system includes a sub-surface supply pipe 53 having laterals 54 formed of porous material such as ceramic pipe. In Figure 10 the sub-surface irrigation system is in the form of a flexible porous hose 55. The hose may be formed of glass fabric or a porous plastic capable of withstanding limited bending and crushing. The hose may be internally strengthened by ceramic porous reinforcing elements 56 in the form of short tubes inserted in the hose as shown in Figures 11 and 12.

The sub-surface irrigation system, particularly when automatically operated by my control means provides a particularly effective means of irrigation for the reason that the surface of the ground may remain covered with mulch or remain sufficiently dry that weeds or other surface plants cannot germinate or grow whereas plants which have developed a root system are adequately supplied with water.

Because of the fact that sub-surface irrigation systems do not provide surface evidence of the need for water, my control means is particularly desirable for use with such systems.

Reference is now directed to Figure 7. In this construction an electric contact means for controlling an electrically operated valve at some remote point is substituted for the diaphragm control valve 43. This may be accomplished by providing an opening in the side of the tube 41 covered by a diaphragm 61. The diaphragm is in turn covered by a switch housing 62 in which are mounted switch contacts 63 arranged to be opened when the diaphragm moves outwardly and closed when the diaphragm moves inwardly in response to pressure conditions within the tube 41 and the porous unit 42. In place of an electrically operated valve, the switch may control an alarm system, and the water may be turned on and off manually.

The operation of my control means as adapted for outdoor irrigation whether above surface or sub-surface, is essentially the same as described in connection with Figs. 1 through 4. In further explanation of the operation of my control means, reference is directed to Figs. 13, 14, and 15.

Fig. 13 is a graph plotted as soil moisture tension vs. time. It will be seen that considering "0" as zero gauge pressure or one atmosphere, and the values 5, 10, etc., as pounds per square inch of sub-atmospheric pressure, the soil moisture tension increases between irrigations and suddenly drops when the irrigation water reaches the soil adjacent the porous cell.

Fig. 14 is a graph showing soil moisture percentage vs. time and corresponds in time to the conditions shown in Fig. 13. Thus, Fig. 14 shows the corresponding changes that occur in the moisture content of the soil as the tension varies.

Fig. 15 is a typical curve showing the relation between soil moisture tension and soil moisture percentage for a medium textured soil.

As will be noted in Figs. 13 and 14 the time between irrigations will depend on the rate of water extraction by the roots, which in turn will be determined by the weather conditions and the size and condition of the plants. Thus, the intervals between irrigations will vary over a wide range, however, my control means automatically maintains the correct supply of water both as to time and quantity irrespective of the substantial variation in demand.

In general, it is preferable to irrigate the soil slowly over a period of time; practically, however, this cannot be done conveniently by ordinary methods without an excessive amount of time and trouble. With my automatic control means this can be accomplished without the customary care and attention.

Though I have shown and described certain embodiments of my invention, I do not wish to be limited thereto but desire to include all novelty inherent in the appended claims.

I claim:

1. A method of irrigating plants characterized by: placing a liquid filled porous cell in moisture transfer relation to soil in proximity to a plant to be irrigated thereby to produce liquid pressures in said cell between atmospheric and sub-atmospheric values corresponding to the tension of the moisture contained in the surrounding soil; supplying water to the soil upon reduction of liquid pressure in said cell to a predetermined value caused by outward migration of liquid from said cell to the surrounding soil; and terminating the supply of water to the soil upon return of pressure in said cell caused by migration of water from the surrounding soil to said cell.

2. A method of irrigating plants, characterized by: exposing a liquid-containing porous cell to soil to produce therein a pressure corresponding to and variable with the soil moisture tension; supplying water to said soil in response to reduction of pressure in said cell to a predetermined minimum value; and terminating the supply of water to said soil in response to rise of pressure in said cell to a predetermined maximum value.

3. A method of irrigating plants, characterized by: placing a liquid filled porous cell in soil the moisture content of which is representative of the moisture in the soil embraced by the root system of the plant to be irrigated; maintaining in said cell a liquid pressure corresponding to and representative of the moisture tension in the surrounding soil; and wetting the soil to field capacity whenever the pressure in said cell falls to a predetermined minimum.

4. A method of irrigating plants, characterized by: establishing a moisture transfer relation between a porous cell buried in soil and the surrounding soil; maintaining in said cell a closed, liquid filled and substantially air free system in communication with the interior of said cell whereby the pressure in said cell and system reflects the moisture tension in the surrounding soil; irrigating the soil whenever the moisture tension therein, as reflected by the pressure of liquid in said system reaches a predetermined maximum value; terminating the irrigating of the soil whenever the moisture tension therein reaches a predetermined minimum value.

5. A means for irrigating plants, comprising: a closed porous cell adapted to be filled with liquid and disposed in moisture transfer relation to soil in proximity to a plant to be irrigated, said cell being otherwise sealed whereby the pressure in said cell tends to vary between atmospheric pressure and sub-atmospheric pressure with the moisture content of the soil; a pressure sensitive device exposed to the pressure within said cell; and water supplying means operably connected with said device to supply water to the soil when the pressure in said cell falls to a predetermined value and to terminate the supplying of water when the pressure in said cell approaches atmospheric pressure, whereby the soil is alternately dried and wetted.

6. A means for irrigating plants, comprising: sealed means adapted to contain a liquid and including a porous cell adapted to be positioned in moisture contact but substantially non-transferring relation with soil whereby the pressure within said means corresponds to the soil moisture content; and an irrigator including a pressure sensitive valve operatively associated with said means to supply water to the soil when the pressure in said cell and means drops to a value reflecting a predetermined minimum soil moisture content and terminates the supply of water when the pressure in said cell reflects a soil moisture content exceeding the field capacity of the soil.

7. A means for irrigating plants, comprising: a self-contained unit including a liquid chamber, a porous cell forming a portion of the chamber wall and a pressure sensitive element forming another portion of said chamber wall, said chamber adapted to be filled with water and said porous cell disposed in moisture contact but substantially non-transferring relation with soil whereby the water pressure in said chamber varies with the moisture content of the soil; and an irrigating means including a valve responsive to said pressure sensitive element for supplying water to the soil at a rate in excess of the demand of the soil and to terminate the supply of water when the moisture content of the soil exceeds its field capacity.

8. A means for irrigating plants, comprising: a self-contained unit including a liquid chamber, a porous cell forming a portion of the chamber wall and a pressure sensitive element forming another portion of said chamber wall, said chamber adapted to be filled with water and said porous cell disposed in moisture contact but substantially non-transferring relation with soil whereby the water pressure in said chamber varies with the moisture content of the soil; and an irrigating means for the soil including a porous conduit buried in the soil and capable of supplying water in excess of the demand of the soil, and a valve for controlling the supply of water to said conduit, said valve being responsive to the sensitive element to open when the soil moisture content drops below a predetermined value and closes when the soil moisture exceeds the field capacity of the soil.

9. A means for irrigating plants as set forth in claim 8 wherein said porous conduit is a flexible woven fibrous or plastic tube.

10. A means for irrigating plants, comprising: a container for a plant and soil therefor; a water supply compartment of limited capacity below said container means for transferring water from said compartment to the soil in said container at a rate in excess of the demand of said plant until the water is substantially exhausted; a porous cell buried in the soil; a self-contained unit including a liquid chamber, a porous cell forming a portion of the chamber wall and a pressure sensitive element forming another portion of said chamber wall, said chamber adapted to be filled with water and said porous cell disposed in moisture contact by substantially non-transferring relation with soil whereby the water pressure in said chamber varies with the moisture content of the soil as the soil dries out; and a valve means controlled by said pressure sensitive element to refill said compartment when the moisture content of said soil has dried out to a predetermined value, following the exhaustion of water in said water supply compartment thereby to introduce a time delay before refilling said water supply compartment.

11. An irrigation means for plants, comprising: means sensitive to the moisture content of the soil in proximity to plants; and a valve operatively connected with said moisture sensitive means for controlling the supply of water at a rate in excess of the demand of the soil; said moisture sensitive means being operable to open said valve when the moisture content of said soil reaches a predetermined minimum value and to close said valve when the moisture content of the soil exceeds the field capacity of the soil, thereby to introduce a time delay between supply periods to permit partial drying of the soil.

12. A method of automatically irrigating plants, characterized by: exposing continuously a liquid filled porous cell to soil containing plants to be irrigated, thereby to produce in said cell atmospheric pressure when the soil is wetted to field capacity and to produce in said cell sub-atmospheric pressure reflecting the decrease in moisture content as the soil dries out; withholding irrigation until a predetermined sub-atmospheric pressure exists in said cell then wetting said soil to field capacity and restore atmospheric pressure to said cell, thereby to effect alternate wetting and drying of the soil.

13. A means for intermittently irrigating plants, comprising: a closed system including a porous wall exposed to soil to be irrigated, said system being substantially full of water, and so arranged that the pressure on the water varies from atmospheric pressure when the soil is saturated to field capacity, to sub-atmospheric pressure as the moisture in the soil is reduced; means for supplying water to the soil at a rate in excess of demand of the soil whereby the soil may be saturated to field capacity; and means responsive to the pressure in said closed system for initiating the supply of water from said means when the pressure in said system falls to a predetermined value and for terminating the supply of water when the pressure in said system approaches atmospheric pressure, thereby to effect intermittent drying and wetting of the soil.

14. A means for intermittently irrigating plants, comprising: a closed chamber including a porous wall and adapted to be buried in the soil to be irrigated whereby when said chamber is filled with water, water contact is made through said wall with the moisture contained in the surrounding soil, said wall tending to prevent escape of water from said chamber and causing the water pressure in said chamber to vary with change in the moisture content of the soil; means responsive to a predetermined low pressure in said chamber to initiate an extraneous supply of water to said soil, and responsive to a predetermined high pressure in said chamber to terminate said supply, thereby to effect intermittent drying and wetting of the soil.

LORENZO A. RICHARDS.

REFERENCES CITED

The following references are of record in the file of this patent:

UNITED STATES PATENTS

| Number | Name | Date |
|---|---|---|
| 1,710,362 | Korneff | Apr. 23, 1929 |
| 2,084,005 | Richards | June 15, 1937 |